(12) United States Patent
Takenaga

(10) Patent No.: US 6,764,050 B2
(45) Date of Patent: Jul. 20, 2004

(54) BAND CLAMP

(75) Inventor: Hitoshi Takenaga, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/233,492

(22) Filed: Sep. 4, 2002

(65) Prior Publication Data

US 2003/0075647 A1 Apr. 24, 2003

(30) Foreign Application Priority Data

Sep. 6, 2001 (JP) ........................................ 2001-270707

(51) Int. Cl.[7] .............................................. F16B 45/00
(52) U.S. Cl. ....................... 248/71; 24/16 PB; 248/74.3
(58) Field of Search ........................ 248/71, 74.3, 74.2, 248/74.1; 24/16 PB

(56) References Cited

U.S. PATENT DOCUMENTS 3,465,992 A * 9/1969 Schuplin ...................... 248/71
5,014,939 A * 5/1991 Kraus et al. .................... 248/70
5,131,613 A * 7/1992 Kamiya et al. ............. 248/74.3
5,584,452 A * 12/1996 Koike ......................... 248/74.3

FOREIGN PATENT DOCUMENTS

JP          6-291473      * 6/1994

* cited by examiner

Primary Examiner—Ramon O Ramirez
(74) Attorney, Agent, or Firm—Finnegan, Henderson, Farabow, Garrett & Dunner, L.L.P.

(57) ABSTRACT

A band clamp includes a band for bundling up a wire harness and a clamp engaged with an attachment portion of a vehicle body. The band and the clamps are separately prepared and a plurality of clamp types are prepared. Also, a common-use plug portion is provided on the band and a common-use fixing portion is provided on the clamp. By combining the band with one clamp selected from among a plurality of the clamps and plugging the common-use plug portion of the band into the common-use plug portion of the selected clamp, the band clamp is obtained.

20 Claims, 4 Drawing Sheets

PRIOR ART         PRIOR ART

PRIOR ART

BAND CLAMP

BACKGROUND OF THE INVENTION

1. Field of the Invention

The present invention relates to a band clamp for arranging a wire harness to a vehicle body.

2. Description of the Related Art

A band clamp is used as means for arranging a wire harness that has bundled up a plurality of wires to a vehicle body. For examples, for the purpose of bundling up a plurality of wires wired within an interior of a vehicle body and arranging them to an inner wall surface of the vehicle body as an attachment member, band clamps having various configurations are widely used for the reason that they are easy of handling.

For example, as shown in FIG. 1A and FIG. 1B, in a band clamp 1 which is now on file, a plurality of wires are bundled up by winding a band 2 around them (not illustrated) and a forward end 2a of the band 2 is inserted into a band lock 2b. Further, a wire harness bundled up a plurality of wires is arranged to an inner wall surface of a vehicle body by inserting an engaging twin-blade type clamp 3a provided on a clamp 3 into a prescribed hole (not illustrated) equipped in the wall surface.

Also, as shown in FIG. 2A and FIG. 2B, in a band clamp which is now on file, a plurality of wires are bundled up by winding a band 6 around them (not illustrated) and a forward end 6a of the band 6 is inserted into a band lock 6b. Further, a wire harness bundled up a plurality of wires is arranged to an inner wall surface of a vehicle body by engaging a screw thread mount engagement portion 7a provided on a clamp 7 with a screw thread mount (not illustrated) equipped with a bolt projected from the wall surface.

This band clamp is easy of handling and is capable of being mass-produced through the use of injection molding. However, it is necessary to prepare a band clamp having particular configuration for each automobile type or automobile manufacturer according to the conditions to arrange a wire harness to an attachment member, and therefore one band clamp can not flexibly be applied to a plurality of automobile types or automobile manufactures. Further, since it is necessary to manufacture a band clamp die having particular configuration for each automobile type or automobile manufacturer, the cost to manufacture the band clamp is increased in proportion to the number of automobile types or automobile manufactures.

SUMMARY OF THE INVENTION

Therefore, it is an object of the present invention to provide a band clamp which can flexibly be applied to the conditions of various vehicle bodies and it is another object of the present invention to realize that the cost to manufacture the band clamp is reduced.

To achieve the above objects, there is provided a band clamp comprising: a band for bundling up a wire harness; a clamp engage with an attachment portion of a vehicle body; a common-use fixing portion provided on the clamp; and a common-use plug portion provided on the band and fitted into the common-use fixing portion, wherein the band and the clamp are separately prepared for flexibly arranging the wire harness to the vehicle body, whereby a plurality of clamp types can be prepared to flexibly conform to the conditions of various vehicle bodies.

According to the present invention, the band and the clamps are separately prepared and one clamp is freely selected from among a plurality of clamps so as to conform to the condition of the vehicle body. Therefore, from among a plurality of clamps satisfying the requirements fore each vehicle type and automobile manufacturer, one clamp complying with the suitable condition can be selected and this selected clamp is combined with the band, thereby the desired band clamp can be obtained.

Especially, even in a case where it is needed to use the band clamp having a clamp whose configuration is in compliance with the new requirements for new type of automobile, by making the use of the band common, the band clamp can flexibly be applied to the conditions of some vehicle bodies by newly preparing only clamp dies. Therefore, the cost to manufacture the band clamp is reduced.

In a preferred embodiment of the present invention, there is provided a band clamp further comprising a clamp portion provided on the clamp and fitted into the attachment portion of the vehicle body; wherein the attachment portion is a fitting hole.

According to the embodiment, in a case where the band clamp is engaged with the fitting hole that has various hole diameters and configurations, the band clamp needs only to replace the clamp with a clamp having the clamp portion corresponding to the fitting hole without exchanging the band satisfying the conditions for bundling up the wire harness.

In a preferred embodiment of the present invention, there is provided a band clamp further comprising a clamp portion provided on the clamp and screwed on the attachment portion of the vehicle body; wherein the attachment portion is a stud bolt that projects from the vehicle body.

According to the embodiment, in a case where engaging the band clamp with the screw thread mount portion having various mount diameters, the band clamp needs only to replace the clamp with a clamp having the clamp portion corresponding to the screw thread mount portion without exchanging the band satisfying the conditions for bundling up the wire harness.

In a preferred embodiment of the present invention, the common-use fixing portion is provided at a position remote from the center axis of the clamp portion of the clamp.

According to the embodiment, in a case where it is difficult to equip the attachment portion with which the band clamp is engaged at the just position where the wire harness is to be arranged for the structural reason of the vehicle body, by providing the common-use fixing portion at a position remote from the center axis of the clamp, the band clamp needs only to replace the clamp with a clamp having provided the common-use fixing portion at the position remote from the center axis of the clamp without exchanging the band satisfying the conditions for bundling up the wire harness.

In a preferred embodiment of the present invention, the common-use plug portion has a rail-shaped convex portion that is substantially T-shaped in the cross section and the common-use fixing portion has a rail-shaped concave portion that is substantially C-shaped in the cross section.

According to the embodiment, by the rail-shaped convex portion of the common-use plug portion that is substantially T-shaped in the cross-section, being plugged into the rail-shaped concave portion of the common-use fixing portion that is substantially C-shaped in the cross section, the common-use plug portion and the common-use fixing portion are interfitted with each other, thereby the band and the clamp are connected together. Therefore, since there is no need to use a new tool (e.g., a screw) for connecting the common-use plug portion and the common-use fixing portion, the cost to manufacture the band clamp is reduced.

DESCRIPTION OF THE PREFERRED EMBODIMENTS

An embodiment of a band clamp according to the present invention will be explained in detail with reference to the drawings.

Figure 4:
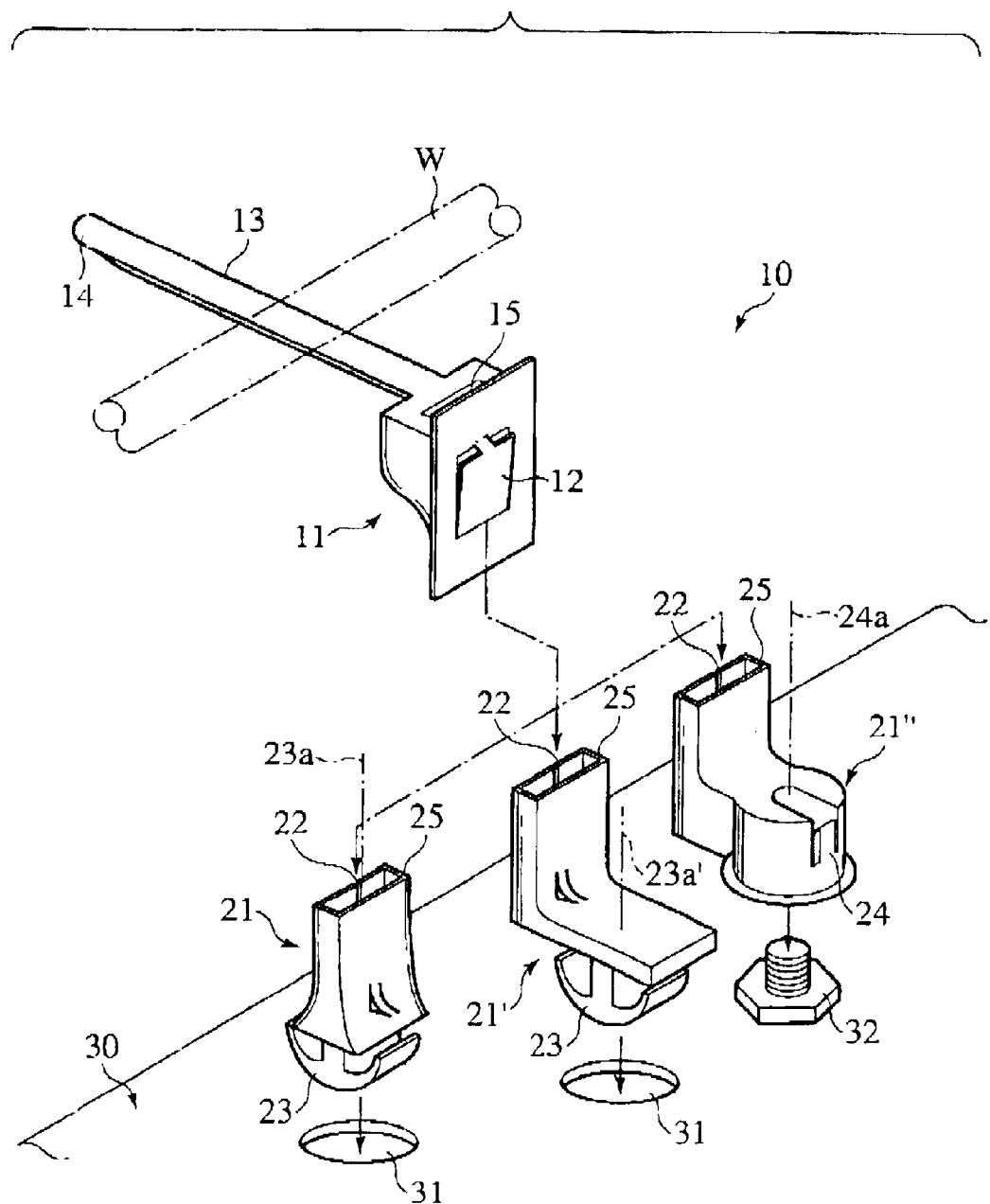
FIG. 4 is a perspective view illustrating the construction of a band that is exchangeable with the band of the band clamp illustrated in FIG. 3 and the construction of clamps that are exchangeable with the clamp of the band clamp illustrated in FIG. 3.

As shown in FIG. 4, in a band clamp 10 according to this embodiment, a band for band element) 11 and clamps (or clamp elements) 21, 21', and 21" are separately prepared and the band clamp 10 is formed by combining the band 11 with each clamp 21, 21', and 21" freely. The band 11 of synthetic resin bundles up a wire harness W by being wound onto around it. Also, a common-use plug portion 12 is provided on a base end of the band 11. The clamps 21, 21', and 21" of synthetic resin are respectively engaged with attachment portions 31 and 32 equipped on the vehicle body panel (the member to which the clamp is attached) 30. Also, common-use fixing portions 22 that are freely interfitted with the common-use plug portion 12 are provided in the clamps 21, 21', and 21" respectively.

The band 11 has a band portion 13 and a band lock portion 15. The band portion 13 is wound onto the outer-periphery of the wire harness W. The band lock portion 15 is provided on the base end side of the band portion 13. Also, the band lock portion 15 is engaged with a forward end side 14 of the band portion 13 to thereby bundle up the wire harness W. Further, an end surface of the band lock portion 15 has provided thereon the common-use plug portion 12.

The clamp 21 has the common-use fixing portion 22 and the clamp portion (or attaching portion) 23. the common-use fixing portion 22 is projectingly provided on a base end of the clamp portion 23. The clamp portion 23 is freely fitted into a fitting hole 31, which is circular in terms of its configuration of plane, that serves as the attachment portion equipped on the vehicle body panel 30.

As in the case of the clamp 21, the clamp 21' has the common-use fixing portion 22 and the clamp portion 23. The common-use fixing portion 22 is projectingly provided on the base end of the clamp portion 23. The clamp portion 23 is freely fitted into the fitting hole 31, which is circular in terms of its configuration of plane, equipped on the vehicle body panel 30.

In the clamp 21, there is provided the common-use fixing portion 22 at the position along a center axis 23a of the clamp portion 23. However, in the clamp 21', the common-use fixing portion 22 is provided at the position remote from the center axis 23a' of the clamp portion 23.

The clamp 21" has the common-use fixing portion 22 and a clamp portion 24. The common-use fixing portion 22 is projectingly provided on the base end of the clamp portion 24. The clamp portion 24 is freely screwed on the stud bolt 32 serving as the attachment portion equipped on the vehicle body panel 30.

Also, in the clamp 21", there is provided the common-use fixing portion 22 at the position remote from the center axis 24a of the clamp portion 24.

The common-use plug portion 12 is a rail-shaped convex portion that is substantially T-shaped in the cross section. The common-use fixing portion 22 is a rail-shaped concave portion that is substantially C-shaped in the cross section. By inserting the common-use plug portion 12 from a forward end side 25 of the common-use fixing portion 22, the common-use plug portion 12 is fitted into the common-use fixing portion 22. In accordance with such method, the band 11 and one clamp selected from among the clamps 21, 21', and 21" are connected to each other.

In the band clamp 10 according to this embodiment, the band 11 and each of the clamps 21, 21', and 21" are manufactured by using an injection-molding technique. Further, by one clamp being selected from among the clamps 21, 21', and 21" and this clamp being connected to the band 11, the structure which is optimum for arranging the wire harness W to the attachment portion can be obtained.

Figure 1A:
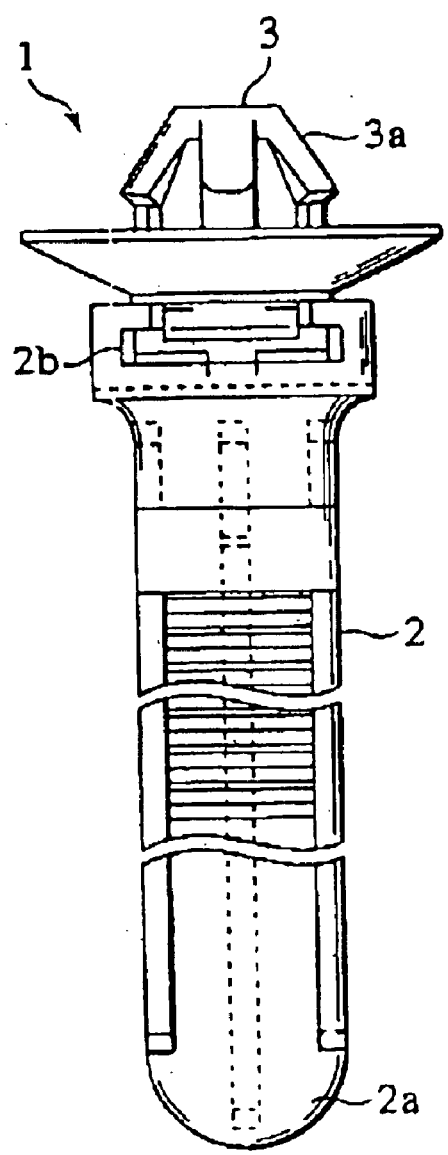
FIG. 1A is a front view illustrating a conventional band clamp on which, a engaging twin-blade type clamp is provided.
Figure 1B:
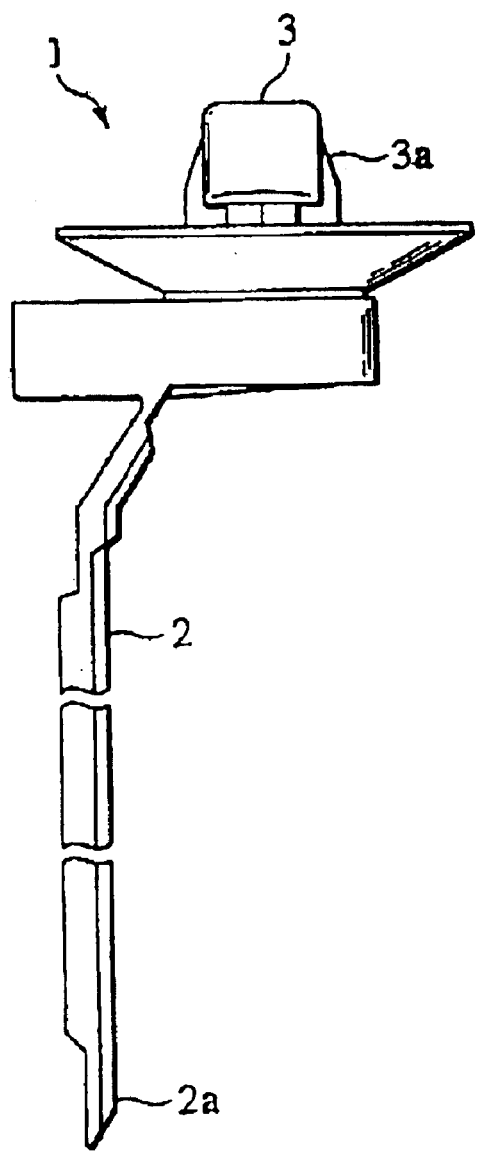
FIG. 1B is a side view of FIG. 1A.
Figure 2A:
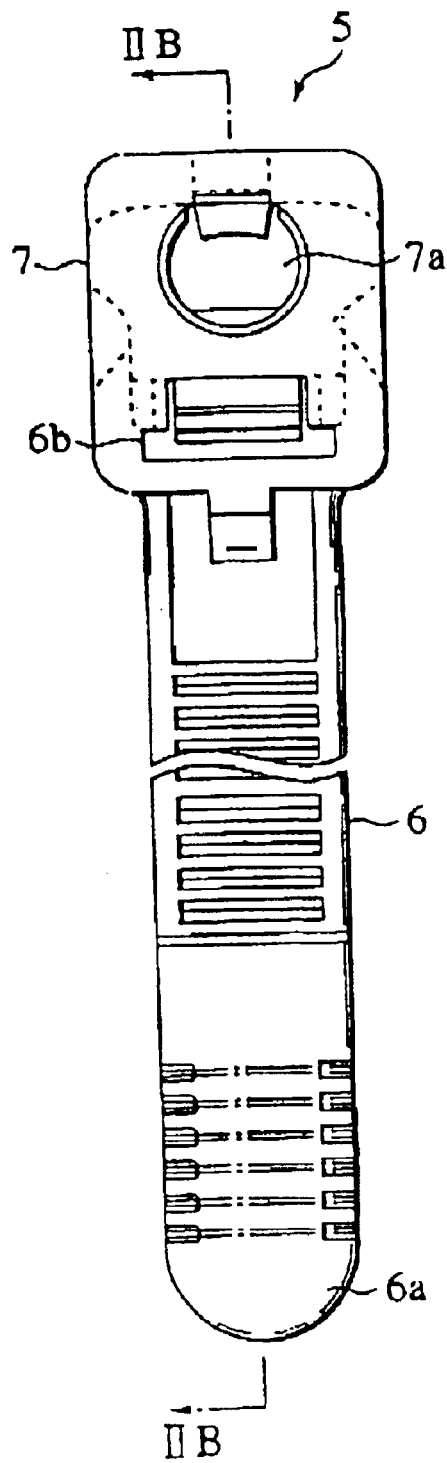
FIG. 2A is a front view illustrating a conventional band clamp on which a clamp fitted onto the screw thread of a stud bolt is provided.
Figure 2B:
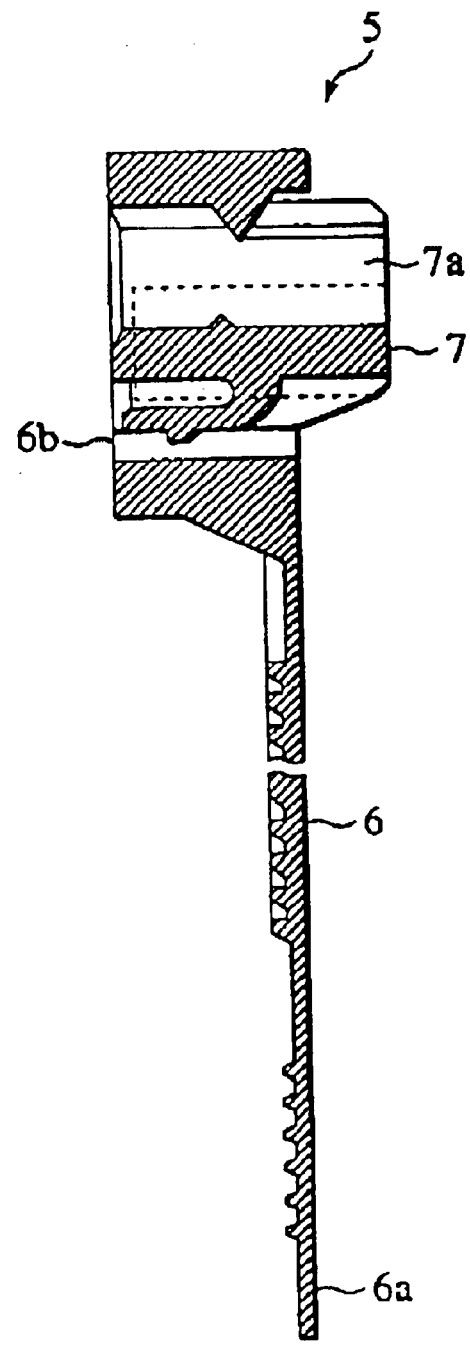
FIG. 2B is a sectional view taken along a line IIB-IIB of FIG. 2A.
Figure 3:
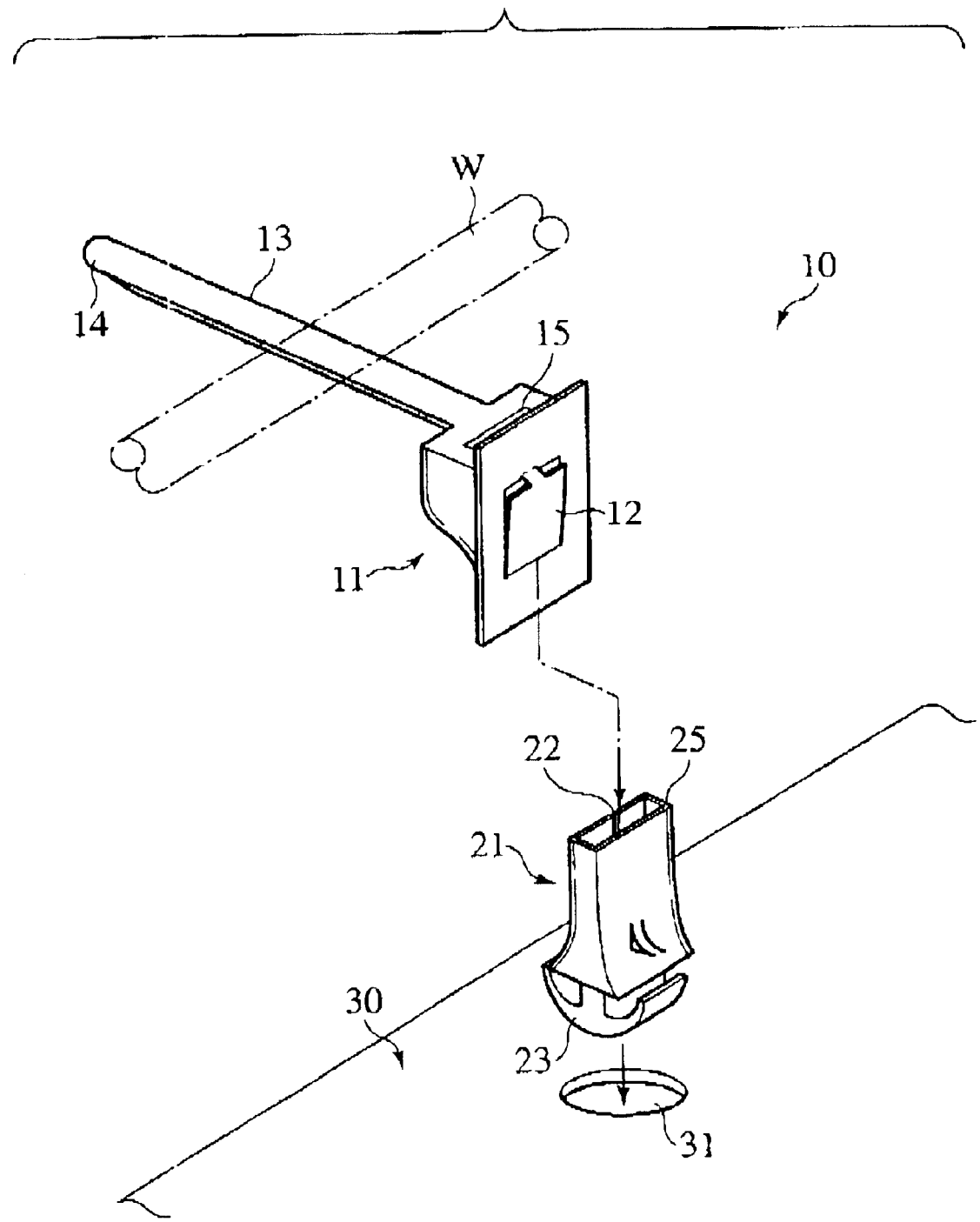
FIG. 3 is a perspective view illustrating a combined example of a band clamp according to the present invention.

As illustrated in FIG. 3, for example, in order to arrange the wire harness W to the vehicle body panel 30 by using the band clamp 10 having the band 11 and the clamp 21, the band portion 13 of the band 11 is wound onto around the wire harness W at a prescribed position thereof and the forward end side 14 of the band portion 13 is inserted in the band lock portion 15. By doing so, the wire harness W is bundled up.

And, the clamp portion 23 of the clamp 21 is fitted into the fitting hole 31. Thereafter, the common-use plug portion 12 of the band 11 is inserted into the common-use fixing portion 22 of the clamp 21. As a result of this, the wire harness W is arranged at the prescribed position of the vehicle body panel 30.

Also, in the example illustrated in FIG. 3, the clamp 21 wherein the common-use fixing portion 22 is provided on the center axis 23a of the clamp portion 23 is used. However, as illustrated in FIG. 4, the clamp 21' having provided the common-use fixing portion 22 at the position remote from the center axis 23a' of the clamp portion 23 may be used instead of the clamp 21.

Further, the clamp 21" screwed on the stud bolt 32 projectingly provided on the vehicle body panel 30 may be used instead of the clamp 21.

As illustrated in FIG. 4, the fitting holes 31 which are the attachment portions of the clamp 21 and clamp 21' are circular in terms of their configuration of plane. However, in a case where the fitting hole 31 takes various diameters and configurations, the band 11 satisfying the condition for bundling up the wire harness W is not exchanged, and only the clamp 21 and clamp 21' are replaced with a clamp having a suitable clamp portion conforming to the configuration of the fitting hole 31. Therefore, it is not necessary to manufacture a new band clamp 10 from the outs t.

Also, in a case where the stud bolt 32 which is the attachment portion has various diameters of the screw thread mount, the band 11 satisfying the conditions for bundling up the wire harness W is not exchanged, only the clamp 21" is replaced with a clamp having a suitable clamp portion conforming to the diameter of the screw thread mount. Therefore, it is not necessary to manufacture a new band clamp 10 from the outset.

Further, in a case where it is difficult to equip the fitting hole 31 as the attachment portion into which the band clamp 10 is fitted at the just position where the wire harness W is to be arranged for the reason of the structure of the vehicle body panel 30, etc., as illustrated in FIG. 4, the common-use fixing portion 22 is provided at the position remote from the center axis 23a' of the clamp portion 23. By doing this, without exchanging the band satisfying the condition for bundling up the wire harness W, only the clamp is replaced with the clamp 21' having provided the common-use fixing portion 22 at the position remote from the center axis 23a' of the clamp portion 23. As a result of this, the wire harness W can be arranged at the predetermined position on the vehicle body panel 30. Similarly, in a case where it is difficult to provide the stud bolt 32 as the attachment portion at the just position where the wire harness W is to be arranged for the reason of the structure of the vehicle body panel 30, etc., as illustrated in FIG. 4, the common-use fixing portion 22 is provided at the position remote from the center axis 24a of the clamp portion 24. By doing this, without exchanging the band satisfying the condition for bundling up the wire harness W, only the clamp is replaced with the clamp 21" having provided the common-use fixing portion 22 at the position remote from the center axis 24a of the clamp portion 24. As a result of this, the wire harness W can be arranged at the predetermined position on the vehicle body panel 30. For the above-described reason, it is not necessary to manufacture a new bad clamp having provided thereon the band at the position remote from the center axis of the clamp.

Further, in a case where it is difficult to fit the band clamp, with the wire harness W being bundled up, into the fitting hole 31 as the attachment portion from the standpoint of the structure of the vehicle body panel 30, the band 11 having bundled up the wire harness W needs only to be fixed to the clamp 21 or the clamp 21' after the clamp 21 or the clamp 21' has been fixed to the fitting hole 31. Similarly, in a case where it is difficult to fit the band clamp, with the wire harness W being bundled up, into the stud bolt 32 as the attachment portion front the standpoint of the structure of the vehicle body panel 30, the band 11 having bundled up the wire harness W needs only to be fixed to the clamp 21" after the clamp 21" has been fixed to the stud bolt 32. For these reasons, the efficiency of the operation for attaching the band clamp 10 to attachment portion of the vehicle body panel 30 is enhanced.

By combining the band 11 with one clamp selected from among the clumps 21, 21', and 21" to obtain the desired band clamp 10, it is possible to flexibly cope with any of the arranging conditions for the wire harness W.

Especially, even in a case where it is necessary to prepare a band clamp having a clamp whose configuration must be in conformity with the new requirements for new type of automobile, by making the use of the band 11 common, the band clamp can flexibly be applied to any of the attaching conditions on the vehicle body panel 30 by newly preparing only the clamp die. Therefore, the cost to manufacture the band clamp is reduced.

Incidentally, the above-described embodiment is one example of the present invention. For this reason, the present invention is not limited to the above-described embodiment and therefore the present invention can be variously modified according to the design, etc. to modes of invention other than the above-described embodiment without departing from the technical idea of the invention.

Namely, in this embodiment, the common-use plug portion 12 has the rail-shaped convex portion that is substantially T-shaped in the cross section while the common-use fixing portion 22 has the rail-shaped convex portion that is substantially C-shaped in this cross section. However, even if the common-use plug portion 12 is formed into a rail-shaped concave portion that is substantially C-shaped in the cross section and the common-use fixing portion 22 is formed into a rail-shaped convex portion that is substantially T-shaped in the cross section, it does not affect the effects that are attainable from the present invention.

Also, in this embodiment, by perpendicularly sliding the common-use plug portion 12 into the common-use fixing portion 22 with respect to the vehicle body panel 30, the band 11 and one clamp selected from among the clamps 21, 21', and 21" are interfitted with each other. However, it is also possible to perform interfitting of them by horizontally sliding the common-use plug portion 12 into the common-use fixing portion 22 with respect to the vehicle body panel 30.

Furthermore, it is possible to fix the band clamp 10 with respect to the attachment portions 31 and 32 from a wide variety of directions by applying other structure as the interfitting structure between the common-use plug portion 12 and the common-use fixing portion 22. Therefore, the efficiency of the operation for attaching the band clamp 10 to attachment portion on the vehicle body panel 30 is enhanced. That is, even if it is different in configuration from that of this embodiment for the configuration of the common-use plug portion 12 and the common-use fixing portion 22, it does not have any adverse effect upon the effects attainable from the present invention only if each of them has a construction of permitting free interfitting of them.

What is claimed is:

1. A band clamp, comprising:
    a band element including:
        a band portion having a first end and a second end;
        a band lock coupled to the first end of the band portion and adapted to receive and secure the second end of the band portion; and
        a plug portion; and
    a clamp element configured to be secured to an object, the clamp including a fixing portion for fixedly coupling with the plug portion of the band element.

2. A band clamp according to claim 1, wherein the band portion extends generally perpendicular to the plug portion.

3. A band clamp according to claim 1, wherein the fixing portion is located remote from a center axis of the clamp element.

4. A band clamp according to claim 1, wherein one of the fixing portion of the clamp element and the plug portion of the band element includes a T-shaped cross-section.

5. A band clamp according to claim 4, wherein the other of the fixing portion of the clamp element and the plug portion of the band element includes a C-shaped cross-section.

6. A band clamp according to claim 1, wherein the clamp element includes an attaching portion configured to be received in a circular opening of the object.

7. A band clamp according to claim 1, wherein the clamp element includes an attaching portion having threads.

8. A band clamp assembly, comprising:
a band element including:
   a band portion having a first end and a second end;
   a band lock coupled to the first end of the band portion and adapted to receive and secure the second end of the band portion; and
   a plug portion; and
a clamp element selected from a group having a plurality of different shapes, the clamp element configured to be secured to an object and include a fixing portion for fixedly coupling with the plug portion of the band element.

9. A band clamp assembly according to claim 8, wherein the band portion extends generally perpendicular to the plug portion.

10. A band clamp assembly according to claim 8, wherein the clamp element includes a fixing portion located remote from a center axis of the clamp element.

11. A band clamp assembly according to claim 8, wherein one of the fixing portion of the clamp element and the plug portion of the band element includes a T-shaped cress-section.

12. A band clamp assembly according to claim 11, wherein the other of the fixing portion of the clamp element and the plug portion of the band element includes a C-shaped cross-section.

13. A band clamp assembly according to claim 8, wherein the clamp element includes an attaching portion configured to be received in a circular opening of the object.

14. A band clamp assembly according to claim 8, wherein the clamp element includes an attaching portion having threads.

15. A method of securing, comprising:
securing a first object to a band element having a band portion including a first end and a second end, a band lock coupled to the first end of the band portion and adapted to receive and secure the second end of the band portion, and a plug portion;
securing a clamp element to a second object, the clamp element being selected from a plurality of differently shaped clamp elements, each of which includes an attaching portion and a commonly shaped fixing portion; and
fixedly securing the plug portion of the band element to the fixing portion of the clamp element.

16. The method of securing according to claim 15, wherein the plurality of differently shaped clamp elements includes a first clamp element having a fixing portion located along a center axis of the first clamp element, and a second clamp element having a fixing portion located remote from a center axis of the second clamp element.

17. The method of securing according to claim 15, wherein one of a fixing portion of one of the plurality of clamp elements and the plug portion of the band element includes a T-shaped cross-section.

18. The method of securing according to claim 17, wherein the other of the fixing portion of the clamp element and the plug portion of the band element includes a C-shaped cross-section.

19. The method of securing according to claim 15, wherein at least one of the clamp elements of the plurality of clamp elements includes an attaching portion configured to be received in a circular opening of the second object.

20. The method of securing according to claim 15, wherein at least one of the clamp elements of the plurality of clamp elements includes an attaching portion having threads.

* * * * *

UNITED STATES PATENT AND TRADEMARK OFFICE
CERTIFICATE OF CORRECTION

PATENT NO. : 6,764,050 B2
DATED : July 20, 2004
INVENTOR(S) : Hitoshi Takenaga

It is certified that error appears in the above-identified patent and that said Letters Patent is hereby corrected as shown below:

Column 7,
Lines 21-22, "cress section." should read -- cross section. --

Signed and Sealed this

First Day of March, 2005

JON W. DUDAS
*Director of the United States Patent and Trademark Office*